Patented Mar. 14, 1950

2,500,179

UNITED STATES PATENT OFFICE 2,500,179

DRY PUDDING COMPOSITIONS AND METHOD FOR PREPARING THE SAME

Henry C. Hinz, Jr., George R. Schermerhorn, Sr., and Frank L. Dorn, Rochester, N. Y., assignors, by mesne assignments, to American Home Foods, Inc., New York, N. Y., a corporation of New Jersey No Drawing. Application February 10, 1948, Serial No. 7,514

11 Claims. (Cl. 99—139)

This invention ralates to a pudding composition and more particularly to a pudding composition in the form of a dry powder which on the addition of a liquid substantially immediately forms into a pudding of superior characteristics.

Commercially available pudding compositions, or in fact any pudding composition at present known, lack one or more desirable qualities depending on the particular composition considered. For example, a particularly desirable pudding quality is one that has "instant" characteristics; that is, the pudding should be substantially immediately ready for serving after mixing with the liquid component without the necessity for any heating or cooking, for careful liquid temperature adjustments, or for extended cooling to obtain a satisfactory set. As an extension of this characteristic, the composition should be able to form a satisfactory pudding when a relatively cold liquid such as cold milk is added thereto. Another desirable characteristic is that the product should have a firm body as distinguished from the soft body obtained with the well-known rennet custards. Likewise, to distinguish from the latter, it should not whey off. A still further desirable characteristic is that the product should be free from a heavy, pasty starchiness and as a corollary, the pudding should contain as little starch as possible consonant with a desirable consistency. A superior pudding should be free from tackiness or gummy characteristics and should have a soft smooth texture yielding superior eating qualities. Known pudding compositions lack some or all of these desirable characteristics and insofar as known, the combination of these highly desirable characteristics in a single composition while long sought has heretofore neither been suggested nor achieved.

According to the present invention a composition possessing the above mentioned highly desirable qualities is accomplished by a particular method of preparing one of the ingredients prior to final mixture and the coaction of basic ingredients in the composition.

An important aspect of the invention is the type of pregelatinized starch used in the pudding composition and the method of obtaining it. Heretofore, it has been suggested that pregelatinized starch suitable for puddings may be obtained by mixing a pudding starch with water, pasting the mixture on roller dryers, removing the product from the roller, mixing the dried product with sugar and finally crushing the mixed product to a grain size that will pass through a screen having about 4000 to 6000 meshes per sq. cm.

Other well-known methods for obtaining pregelatinized starch involve the use of various chemical gelatinizing agents such as calcium chloride, relatively strong alkalies or thiocyanates. The disadvantages of the starch-water roller heating method and the product produced as above described is that the final product is such that much more starch must be used when preparing a pudding composition because the rehydration is much less complete. Since much larger amounts of starch must be used, the flavor of the pudding product is predominantly starchy unless highly masked by flavoring materials. A further disadvantage in the starch-water roller dryer operation is that the starch sheet that is formed on the roller is tough and somewhat similar in physical characteristics to sheet paper. This product can be milled only with great difficulty in view of the tenacious characteristics of the paper-like product. Thus a very finely divided product can be achieved only with great difficulty and undesirably extended milling times. Therefore, a relatively coarse product is usually produced and this factor is reflected in the final pudding product in that the relatively coarse starch product produces a starchy-tasting, grainy, pasty and gummy pudding product lacking even the qualities of the old and well-known cooked starch puddings. The second method for preparing gelatinized starch involving the use of chemicals alone at about room temperature is not feasible when contemplating the preparation of a starch intended as a food. The amount of chemical necessary to effectively gelatinize starch without additional treatment is such as to make the final product inedible. Chemical gelatinization per se is used only in preparing starches intended for uses other than as foods.

We have found that all of the disadvantages of the prior pregelatinized starches may be overcome by a new method of preparation involving the concept of the addition of sugar to the starch prior to drying. A further discovery is that a still further improved product is obtained if a small amount of a chemical gelatinizing agent is also added prior to the drying step. Such a chemical agent may be one of those mentioned above namely, various alkaline materials, such as sodium carbonate or bicarbonate, alkali or alkaline earth metal chlorides or thiocyanates, or other gelatinizing chemical agents known to the art. The product which is removed from the roller, whether the chemical agent is added or not, is frangible and is very easily crushed and ground to a particle size considerably finer than 6000 meshes per sq. cm. in a relatively short time. Unexpectedly, it has been found that the pudding powder containing the pregelatinized starch when both sugar and chemical gelatinizing agent have been added prior to drying requires about 50% less starch for a pudding of comparable consistency to an identical mixture using the gelatinized starch known to the art. If either sugar or chemical agent alone is used a saving of about 20% starch is achieved. Because of this reduction in starch requirement, the pudding product of the invention does not exhibit the pasty starchy taste so common in puddings prepared by conventional methods.

With reference to specific procedure, the novel pregelatinized starch is prepared by mixing known pudding starches with water. A pudding starch may be defined as a starch which will produce a pudding effect. The pudding starch used may be derived from maize, rice, arrowroot, tapioca or from other sources known to the art, but preferably a maize starch is used. This is mixed with water on a basis of about 1 part of starch to about ½ part to 10 parts of water by weight. To this mixture is added sugar to the extent of about ⅓ to 2½ parts of sugar to each part of starch by weight. This mixture is heated and dried, preferably on a roller dryer, although any other heating and drying system may be used with satisfactory results. The dry product is now ground to an extremely fine grain, as fine as can be practically accomplished but with a minimum fineness of about 250 mesh. (U. S. Standard.) Contrary to the general belief that excessive lumpiness develops with the use of extremely fine grain size, it has been found as a matter of fact that a very fine grain size of the order of about 250 mesh yields a pudding having a smooth texture and consistency.

A pudding composition containing the pregelatinized starch as just described requires about 20% less starch to obtain a consistency comparable to a pudding containing the same starch which had been gelatinized by roller drying in the absence of sugar.

An improved pregelatinized starch may also be obtained if there is added to pudding starch and water a chemical gelatinizing agent which facilitates rehydration and gelation of the gelatinized starch material. Certain chemical compounds, notably alkaline compounds namely the alkali and alkaline earth metal chlorides or hydroxides such as sodium hydroxide, sodium carbonate, sodium bicarbonate, calcium hydroxide, various metal thiocyanates, preferably alkaline thiocyanates or still more preferably calcium chloride have the property of increasing the rehydration and gelation characteristics of starch. To prepare an improved product by this method, one mixes 1 part of a pudding starch preferably a maize starch with about ½ to about 10 parts of water by weight. To this is added any one of the chemicals indicated above preferably to the extent of about 1 part of chemical gelatinizing agent such as calcium chloride to from about 20 to about 500 parts of starch, although a ratio of about 1 part of agent, preferably calcium chloride, to from 15 to 10,000 parts of starch is feasible. This mixture is then heated and dried, preferably on a roller dryer, although other heating and drying systems may be used. The product is then ground, in the manner indicated above, namely to a point no coarser than about 250 mesh (U. S. standard). As in the case of the starch prepared with sugar alone, a saving of about 20% starch is achieved in the final mixture.

If one combines a pudding starch with water and with both sugar and chemical gelatinizing agent prior to heat drying and using the amounts indicated above, the final product will be found to be superior both to the product using sugar alone and to the product using the chemical agent alone. Thus, as indicated above, it has been found that a pudding composition containing this pregelatinized starch requires about 50% less starch to obtain a consistency comparable to a pudding containing the same starch which has been gelatinized merely by mixing with water and roller drying in the absence of both sugar and chemical gelatinizing agent. This latter method is obviously preferred since not only is the greatest amount of starch saved, but the final pudding composition has a highly improved taste.

Using this pregelatinized starch, prepared either with sugar alone or with chemical gelatinizing agent alone, or preferably, as above indicated with both, one may mix it with sufficient sugar and flavoring agent to taste which when reconstituted with water produces an excellent "instant" pudding having improved characteristics over puddings known to the art.

A further aspect of our invention involves a novel composition which produces a pudding characterized by its greatly superior eating qualities and having the highly desirable characteristics described above. This composition is prepared by using the specially prepared pregelatinized starch combined with a casein coagulating agent such as an acid or proteolytic enzyme. It has been found, surprisingly, that the pregelatinized starch coacts with the acid or enzyme so that when mixed with cold milk a combining gelling action takes place that is partly contributable to each of the ingredients. In addition it is believed that an important contribution of the casein coagulating agent is to add solid body to the reconstituted starch which improves the rehydration and gelation characteristics of the starch element. This combined gelation results in a pudding product that is tasty and free from gumminess. It does not have a starchy taste since it has less than normal starch content. It has a softer texture and a better consistency characteristic than those products prepared with either gelatinized starch alone or with strong tasting flours depending on rennet action to overcome the characteristics of the flour used.

The acid casein coagulating agent contemplated as suitable for the purpose desired is preferably a solid, crystalline, organic acid which is nutritionally nontoxic and safe. Citric or tartaric acids are representative. While solid acids of this type are preferred, it is feasible to use mineral or organic acids of the liquid type provided, as in the case of the solid acids, that they are nontoxic.

If a proteolytic enzyme is used as the casein coagulating agent in the composition, the enzyme selected may be any of the well-known protein-splitting enzymes as for example, trypsin, pepsin, rennin or other proteolytic enzymes falling within this class.

It should be clearly understood that the proteolytic enzyme used here is not for the purpose of overcoming undesirable gumminess since the novel starch product disclosed here does not possess this characteristic. As indicated above, the enzyme coacts with the starch to produce a combined gelling action so that less starch is needed to obtain the desired effect.

When an acid is used in the composition, the product is extremely suited to producing a fruit-flavored pudding. For other flavors such as chocolate, butterscotch, vanilla and the like, the composition containing the proteolytic enzyme is best. However, for the latter flavors, an acid may be used but the acidity should be neutralized and this may be accomplished in a number of ways. By one method a neutralizing agent is added to the general mixture in a single package. An equally satisfactory product is achieved in a two-package system, one package containing the acid and the other package containing the neutralizing agent. Suitable neutralizing agents are calcium carbonate, calcium hydroxide, sodium carbonate, sodium bicarbonate, the corresponding potassium salts and any other alkaline salts which are stable in dry form are reasonably soluble and of course, nontoxic in the amount used.

The following examples are illustrative of compositions containing the ingredients and the amounts one may use when the mixture is added to one pint of milk. It should be distinctly understood however that the amounts given are by way of illustration and are not to be considered limitative in any way. In addition, all of the ingredients as listed below are not required since one or more may be omitted or equivalent substitutions may be made. Obvious changes may be made by those skilled in the art without changing the essential characteristics and the basic concept of the invention.

Example I

| Ingredients: | Amount in grams |
| --- | --- |
| Dry pregelatinized starch | 30 |
| Tartaric acid | 3 |
| Calcium hydroxide | 0.75 |
| Granulated sugar | 80 |
| Salt | 1 |

Example II

| Ingredients: | Amount in grams |
| --- | --- |
| Dry pregelatinized starch | 30 |
| Granulated sugar | 80 |
| Salt | 1 |
| Proteolytic enzyme | ¼ |

Example III

| Ingredients: | Amount in grams |
| --- | --- |
| Dry pregelatinized starch | 37 |
| Cane sugar | 37 |
| Calcium chloride | 1 |

The above ingredients are mixed with water and the mixture is dried in a roller dryer. The dried pregelatinized starch is ground to about 300 mesh (U. S. standard), and is then mixed with:

| Ingredients: | Amount in grams |
| --- | --- |
| Cane sugar | 37.5 |
| Cocoa | 15.0 |
| Salt | 1.0 |
| Vanilla | 0.5 |

When the composition of Example III is mixed with about one pint of cold milk (about 40° F.) a chocolate pudding of superior eating qualities is produced.

The above compositions may, in addition, contain wetting agents and/or stabilizers. It is of course contemplated that flavoring agents will be added for Examples I and II in the amount desired. In Example I it is to be noted that while calcium hydroxide is used as a neutralizing agent, such an agent is normally omitted or may be reduced in amount if a fruit flavor is used.

As indicated above, the examples merely illustrate preferred compositions. It has been found that excellent puddings may be prepared even though the amounts of each ingredient are varied within rather wide limits. Thus, in the examples, the pregelatinized starch may be varied between 30 and 120 grams and the acid may be varied from 0.5 to about 5.0 grams while the enzyme may be varied from about 0.075 to about 5.0 grams. In the latter case, the amount is based on an enzyme having a strength of about 1 part of enzyme to about 150,000 parts of milk, by weight. The amount of salt may be varied to suit the taste.

A variant to the compositions described is contemplated wherein the pudding powder contains dry powdered milk or casein in addition to pregelatinized starch, or dry powdered milk together with a casein coagulating agent may be added to pregelatinized starch. Such compositions would require only water to form the desired pudding.

Having described our invention, we claim:

1. A composition for producing a pudding comprising a dry, gelatinized starch prepared by mixing a pudding starch with sufficient sugar to form a frangible product when dried, a chemical gelatinizing agent, and water, which is heat dried and then comminuted to fine grain size, together with a flavoring agent.

2. A dry composition for producing a pudding comprising pregelatinized pudding starch, sugar, a rehydrating and gelatinizing agent, and a casein coagulating agent; said ingredients being in dried form.

3. A dry composition for producing a pudding comprising pregelatinized pudding starch, sugar, a rehydrating and gelatinizing agent, and an edible casein coagulating acid; said ingredients being in dried form.

4. A dry composition for producing a pudding comprising pregelatinized pudding starch, sugar, a rehydrating and gelatinizing agent, and a proteolytic enzyme; said ingredients being in dried form.

5. A dry composition for producing a pudding comprising pregelatinized pudding starch, a casein coagulating agent, sugar and a relatively minor proportion of calcium chloride as a rehydration and gelation agent; said ingredients being in dried form.

6. A method for preparing a dry, gelatinized starch having superior water-absorption powers comprising the steps of mixing together a pudding starch, water, sugar and a chemical gelatinizing agent capable of facilitating the rehydration and gelation characteristics of starch, heat-drying the mixture and finally comminuting the dried material to a fine powdery consistency.

7. The method described in claim 6; wherein the chemical gelatinizing agent is calcium chloride.

8. The method of claim 6; wherein the dried material is comminuted to a grain size passable through a screen having about 300 or more meshes to a linear inch.

9. A composition for producing a pudding comprising a heat-dried and finely comminuted mixture of pudding starch, sugar and chemical gelatinizing and rehydration agent, and a flavoring agent.

10. A dry composition for producing a pudding comprising pregelatinized pudding starch, sugar, a rehydration and gelation agent, and a casein coagulating agent in an amount ranging from about 0.075 to about 5.0 grams per pint of milk; said ingredients being in dried form.

11. A dry composition for producing a pudding comprising pregelatinized pudding starch, sugar, a rehydration and gelation agent and a proteolytic enzyme of about 1:150,000 strength and in an amount ranging from about 0.075 to about 5.0 grams per pint of milk; said ingredients being in dried form.

HENRY C. HINZ, Jr.
  GEORGE R. SCHERMERHORN, Sr.
  FRANK L. DORN.

REFERENCES CITED

The following references are of record in the file of this patent:

UNITED STATES PATENTS

| Number    | Name           | Date          |
|-----------|----------------|---------------|
| 2,373,016 | Daly et al.    | Apr. 3, 1945  |
| 2,406,585 | Buchanan et al.| Aug. 27, 1946 |
| 2,418,847 | Musher         | Apr. 15, 1947 |

FOREIGN PATENTS

| Number  | Country       | Date          |
|---------|---------------|---------------|
| 513,464 | Great Britain | Oct. 13, 1939 |